United States Patent
Visagie et al.

(10) Patent No.: US 8,062,992 B2
(45) Date of Patent: *Nov. 22, 2011

(54) CATALYSTS

(75) Inventors: Jacobus Lucus Visagie, Sasolburg (ZA); Jan Mattheus Botha, Sasolburg (ZA); Johannes Gerhardus Koortzen, Sasolburg (ZA); Michael Steven Datt, Johannesburg (ZA); Alta Bohmer, Deneysville (ZA); Jan Van De Loosdrecht, Sasolburg (ZA); Abdool Muthalib Saib, Vanderbijlpark (ZA)

(73) Assignee: Sasol Technology (Proprietary) Limited (ZA)

( * ) Notice: Subject to any disclaimer, the term of this patent is extended or adjusted under 35 U.S.C. 154(b) by 122 days.

This patent is subject to a terminal disclaimer.

(21) Appl. No.: 12/598,687

(22) PCT Filed: May 5, 2008

(86) PCT No.: PCT/IB2008/051723
§ 371 (c)(1),
(2), (4) Date: Nov. 3, 2009

(87) PCT Pub. No.: WO2008/135939
PCT Pub. Date: Nov. 13, 2008

(65) Prior Publication Data
US 2010/0152035 A1 Jun. 17, 2010

(30) Foreign Application Priority Data
May 4, 2007 (ZA) .................................... 07/03621

(51) Int. Cl.
*B01J 23/00* (2006.01)
*B01J 21/00* (2006.01)
*B01J 20/00* (2006.01)

(52) U.S. Cl. ........ 502/326; 502/104; 502/260; 502/327; 502/439

(58) Field of Classification Search .................. 502/104, 502/260, 326, 327, 439
See application file for complete search history.

(56) References Cited

U.S. PATENT DOCUMENTS

| | | | |
|---|---|---|---|
| 4,605,679 | A | 8/1986 | Kobylinski et al. |
| 5,292,705 | A | 3/1994 | Mitchell |
| 5,585,316 | A | 12/1996 | Nay et al. |
| 5,733,839 | A | 3/1998 | Espinoza et al. |
| 6,455,462 | B2 | 9/2002 | Van Berge et al. |
| 2003/0125201 | A1 | 7/2003 | Van Berge et al. |
| 2003/0165424 | A1 | 9/2003 | Ramani et al. |
| 2005/0227866 | A1 | 10/2005 | Berge et al. |

FOREIGN PATENT DOCUMENTS

| | | |
|---|---|---|
| EP | 1 058 580 B1 | 2/2004 |
| EP | 1 444 040 B1 | 6/2005 |
| WO | 0139882 A1 | 6/2001 |
| WO | 2006123179 | 11/2006 |

OTHER PUBLICATIONS

European Patent Office PCT International Search Report, International Application PCT/IB2008/051723, mailed Jan. 19, 2009.
European Patent Office PCT Written Opinion of the ISA, International Application PCT/IB2008/051723, mailed Jan. 19, 2009.
European Patent Office PCT International Preliminary Report on Patentability, International Application PCT/IB2008/051723, completed Aug. 24, 2009.

*Primary Examiner* — Cam N. Nguyen
(74) *Attorney, Agent, or Firm* — Fellers, Snider, Blankenship, Bailey & Tippens, P.C.

(57) ABSTRACT

A process for producing a supported cobalt-based Fischer-Tropsch synthesis catalyst includes, in a first activation stage, treating a particulate catalyst precursor with a reducing gas, at a heating rate, HR1, until the precursor has reached a temperature, $T_1$, where $80°\,C. \leq T_1 \leq 180°\,C.$, to obtain a partially treated precursor. In a second activation stage, the partially treated precursor is treated with a reducing gas, at a heating rate, HR2, where $0 \leq HR2 < HR1$, for a time, $t_1$, where $t_1$ is from 0.1 to 20 hours, to obtain a partially reduced precursor. Thereafter, in a third activation stage, the partially reduced precursor is treated with a reducing gas, at a heating rate, HR3, where HR3>HR2 until the partially reduced precursor reaches a temperature, $T_2$. The partially reduced precursor is maintained at $T_2$ for a time, $t_2$, where $t_2$ is from 0 to 20 hours, to obtain an activated catalyst.

13 Claims, No Drawings

CATALYSTS

THIS INVENTION relates to catalysts. In particular, the invention relates to a process for activating a catalyst precursor, to obtain a supported cobalt-based Fischer-Tropsch synthesis catalyst, and to a catalyst obtained from the process.

As regards supported cobalt-based Fischer-Tropsch synthesis catalysts, it is well-known that precursors of such catalysts are prepared using a metal precursor and a particulate support. The catalyst precursor preparation involves a number of different catalyst preparation steps. The catalyst precursor is then, in an activation process or step, reduced by using a reducing gas such as hydrogen, to obtain an active Fischer-Tropsch synthesis catalyst.

In known activation processes, ie involving reduction of the catalyst precursor in a flowing hydrogen or hydrogen containing gas stream at elevated temperatures, for supported cobalt-based Fischer-Tropsch synthesis catalyst precursors that the Applicant is aware of, hydrogen reduction is carried out at a temperature in the range 250° C. to 500° C., and preferably at low pressures and high linear gas velocities to minimize vapour pressure of any product water which enhances sintering of the reduced metal. It is well known that manipulation of the reduction of cobalt oxide to cobalt metal in different ways influences activity and selectivity of the resultant Fischer-Tropsch synthesis catalyst. In particular, U.S. Pat. No. 4,605,679 discloses that the activity of a cobalt catalyst can be increased by reduction in hydrogen, then re-oxidising the catalyst followed by re-reduction in hydrogen. In U.S. Pat. No. 5,292,705, it is shown that hydrogen reduction in the presence of hydrocarbon liquids enhances the initial Fischer-Tropsch synthesis performance of the catalyst. U.S. Pat. No. 5,585,316 claims that the selectivity of heavier Fischer-Tropsch products is increased if the catalyst is first oxidised and then reduced with carbon monoxide. EP 1444040 discloses a two stage reduction step with pure hydrogen with a catalyst precursor in which all reducible cobalt oxide species combined can be described by the formula-unit $CoO_aH_b$ (where: $a \geq 1.7$ and $b > 0$), resulting in a more economical reduction process without sacrificing Fischer-Tropsch synthesis catalyst activity.

An object of the present invention is to provide a supported cobalt-based Fischer-Tropsch synthesis catalyst having a higher hydrocarbon synthesis activity. Such a catalyst can be obtained with the process of the present invention.

According to the invention, there is provided a process for producing a supported cobalt-based Fischer-Tropsch synthesis catalyst, which process includes in a first activation stage, treating a particulate supported cobalt-based Fischer-Tropsch synthesis catalyst precursor comprising a catalyst support impregnated with cobalt and containing cobalt oxide, with a hydrogen-containing reducing gas or a nitrogen-containing gas, at a first heating rate, HR1, until the precursor has reached a temperature, $T_1$, where 80° C.$\leq T_1 \leq$180° C., to obtain a partially treated catalyst precursor;

in a second activation stage, treating the partially treated catalyst precursor with a hydrogen-containing reducing gas, at a second heating rate, HR2, where 0$\leq$HR2<HR1, for a time, $t_1$, where $t_1$ is from 0.1 to 20 hours, to obtain a partially reduced catalyst precursor; and thereafter in a third activation stage, treating the partially reduced catalyst precursor with a hydrogen-containing reducing gas, at a third heating rate, HR3, where HR3>HR2 until the partially reduced catalyst precursor reaches a temperature, $T_2$, and maintaining the partially reduced catalyst precursor at $T_2$ for a time, $t_2$, where $t_2$ is from 0 to 20 hours, to obtain an activated supported cobalt-based Fischer-Tropsch synthesis catalyst.

It was surprisingly found that a supported cobalt-based Fischer-Tropsch synthesis catalyst having high intrinsic activity was obtained when the catalyst precursor was subjected to the reduction or activation procedure of the invention.

The treatments in the first, second and third activation stages may, at least in principle, be effected by using any suitable contacting configuration of the catalyst precursor with the reducing gas, such as a fluidized bed of the catalyst precursor particles, with the reducing gas acting as the fluidizing medium; a fixed bed of the catalyst precursor particles through which the reducing gas passes; or the like. However, a fluidized bed configuration is preferred.

The first activation stage commences when the catalyst precursor is first subjected to treatment with the hydrogen-containing reducing gas or the nitrogen-containing gas with the immediate application of the first heating rate HR1. The gas in the first activation stage will have a gas space velocity, SV1. Preferably, $1 \leq SV1 \leq 35$ m³$_n$/kg red. Co/h; more preferably, $3 \leq SV1 \leq 15$ m³$_n$/kg red. Co/h. By 'red.Co' or 'reducible cobalt' is meant the cobalt that can be reduced during normal reduction, eg if the catalyst or catalyst precursor contains 20 mass % cobalt and 50% of the cobalt can be reduced, then the amount of reducible cobalt is 0.1 g/g catalyst or catalyst precursor. The first activation stage continues until the precursor attains the temperature $T_1$.

Preferably, 0.5° C./min$\leq$HR1$\leq$10° C./min; more preferably, 1° C./min$\leq$HR1$\leq$2° C./min.

In the first activation stage, $T_1$ may be $\geq$90° C. In one embodiment of the invention, 125° C.$\leq T_1 \leq$150° C. This embodiment will typically apply to precursors obtained by forming a slurry of a particulate catalyst support, a cobalt compound as an active component precursor, and water; subjecting the catalyst support to impregnation with the cobalt compound; drying the impregnated catalyst support; and calcining the impregnated support, such as precursors $B_3$-$B_9$, hereinafter described in Example 2. In another embodiment of the invention, 80° C.$\leq T_1 \leq$110° C., or even 90° C.$\leq T_1 \leq$110° C. This embodiment will typically apply to precursors obtained using the above procedure, but including an organic modifier, such as maleic anhydride, during the impregnation step, such as precursors $C_2$-$C_5$, hereinafter described in Example 3.

The second activation stage thus commences when the precursor has attained the temperature $T_1$, and endures for the time $t_1$ as hereinbefore described. As regards the second activation stage treatment time $t_1$, more preferably $1 \leq t_1 \leq 10$ hours, typically $2 \leq t_1 \leq 6$ hours.

In one embodiment of the invention, in the second activation stage, the precursor may be maintained at the temperature $T_1$, ie HR2=0. Thus, the temperature $T_1$ then constitutes a holding temperature at which the precursor is held for the treatment time $t_1$.

However, in another embodiment of the invention, in the second activation stage, the precursor may be heated from the temperature $T_1$ to a temperature $T_H$ where $T_H > T_1$, ie HR2>0, and $T_H$<200° C. The precursor can, if desired, be held for some time at the temperature $T_1$ before commencing heating thereof to the temperature $T_H$.

In the second activation stage, preferably 0.05° C./min$\leq$HR2$\leq$0.5° C./min; more preferably 0.1° C./min$\leq$HR2$\leq$0.2° C./min.

The third activation stage commences once the time $t_1$ has elapsed. The precursor thus, at the commencement of the third activation stage and in one embodiment of the invention, will still be at the temperature $T_1$, ie at a temperature between 80° C. and 180° C. However, in another embodiment of the invention, the precursor will, at the commencement of the third activation stage, be at the higher temperature, $T_H$. The third activation stage treatment is thus continued until the temperature in the third treatment stage, ie the temperature of the activated Fischer-Tropsch catalyst, reaches $T_2$. Preferably, 300° C.$\leq T_2 \leq$600° C. More preferably, $T_2$ may be in the range of 300° C. to 500° C., with a typical value of $T_2$ being in the range of 300° C. to 450° C. The catalyst can be maintained at $T_2$ for 0-20 hours (ie $t_2$), preferably $0 < t_2 \leq 20$ hours, more preferably $1 \leq t_2 \leq 10$ hours, typically $2 \leq t_2 \leq 6$ hours.

The gas will also, in the second activation stage, have a space velocity, hereinafter referred to as SV2, and will also, in the third activation stage, have a space velocity, hereinafter referred to as SV3.

In one embodiment of the invention, SV1, SV2 and/or SV3 may be constant during the treatments in their respective activation stages. For example, the relationship of the space velocities in the various stages may be SV1=SV2=SV3. However, in another embodiment of the invention, SV1, SV2 and SV3 may vary during the respective activation stages.

In the first activation stage, a hydrogen-containing reducing gas is preferably used, and the gas used in the three activation stages may have the same composition. By 'hydrogen-containing reducing gas' is meant a hydrogen containing gas mixture comprising 10 vol %$<H_2 \leq$100 vol %, more preferably >90 vol % $H_2$ and <10 vol % inerts, most preferably >97 vol % $H_2$ and <3 vol % inerts. The inerts could be any combination of Ar, He, $NH_3$ and $H_2O$, with the preferred dew point of the hydrogen-containing reducing gas being $\leq$4° C., more preferably $\leq$−30° C.

In the first activation stage, a nitrogen-containing gas can instead be used. By 'nitrogen-containing gas' is meant a gas mixture comprising >90 vol % $N_2$ and <10 vol % other components, with the other components being any combination of Ar, He, and $H_2O$. The preferred dew point of the nitrogen-containing gas is $\leq$4° C., more preferably $\leq$−30° C. This nitrogen containing gas does not contain any hydrogen (ie hydrogen=0 vol %).

The treatments in the first, second and third activation stages may be effected at the same or different pressures, and may each be effected at about atmospheric pressure, preferably at between 0.6 and 1.3 bar(a).

The particulate supported cobalt-based Fischer-Tropsch synthesis ('FTS') catalyst precursor may be any suitable catalyst precursor requiring activation or reduction to obtain an active Fischer-Tropsch catalyst, and may be that obtained during preparation of a fresh catalyst or from a regenerated catalyst.

Thus, it may be that obtained during preparation of a fresh catalyst, ie obtained by forming a slurry of a particulate catalyst support, a cobalt compound as an active component precursor, and water; subjecting the catalyst support to impregnation with the cobalt compound; drying the impregnated catalyst support; and calcining the impregnated support, to obtain the catalyst precursor, which contains cobalt oxide. The catalyst precursor thus obtained must, however, then still be activated or reduced prior to using it for catalyzing a Fischer-Tropsch reaction, and this reduction or activation is effected in accordance with the method of the present invention. The resultant catalyst is thus a fresh activated Fischer-Tropsch catalyst.

Instead, the fresh catalyst precursor can be that obtained using the above procedure, but including an organic modifier, such as maleic anhydride, during the impregnation step.

The regenerated catalyst precursor can be that obtained by regenerating a spent cobalt Fischer-Tropsch catalyst, that was used in a FTS process for a period of time, by means of any suitable regeneration process, which results in an oxidized catalyst precursor containing supported cobalt oxide.

Any commercially available pre-shaped porous oxide catalyst support, such as alumina ($Al_2O_3$), silica ($SiO_2$), titania ($TiO_2$), magnesia (MgO), $SiO_2$—$Al_2O_3$ and zinc oxide (ZnO), may be used. The support preferably has an average pore diameter between 8 and 50 nanometers, more preferably between 10 and 15 nanometers. The support pore volume may be between 0.1 and 1.5 ml/g, preferably between 0.3 and 0.9 ml/g.

The support may be a protected modified catalyst support, containing, for example, silicon as modifying component, as generally described in EP Application No. 99906328.2 (European Publication No. 1058580), which is hence incorporated herein by reference.

More specifically, the protected modified catalyst support may be that obtained by contacting a silicon precursor, eg an organic silicon compound such as tetra ethoxy silane ('TEOS') or tetra methoxy silane ('TMOS'), with the catalyst support, eg by means of impregnation, precipitation or chemical vapour deposition, to obtain a silicon-containing modified catalyst support; and calcining the silicon-containing modified catalyst support, eg in a rotary calciner, at a temperature from 100° C. to 800° C., preferably from 450° C. to 550° C., and for a period of from 1 minute to 12 hours, preferably from 0.5 hour to 4 hours.

The cobalt loading can be between 5 gCo/100 g support and 70 gCo/100 g support, preferably between 20 gCo/100 g support and 55 gCo/100 g support.

The cobalt salt may, in particular, be cobalt nitrate, $Co(NO_3)_2 \cdot 6H_2O$.

The impregnation of the catalyst support may, in principle, be effected by any known method or procedure such as incipient wetness impregnation or slurry impregnation. Thus, the impregnation may generally be effected in the manner described in U.S. Pat. No. 6,455,462 or in U.S. Pat. No. 5,733,839, and which are thus incorporated herein by reference thereto.

More specifically, impregnation may be effected by subjecting, at elevated temperature, a slurry comprising the particulate catalyst support, water, and the cobalt salt to a sub-atmospheric pressure environment, which may be down to 5 kPa(a), preferably between atmospheric pressure and 10 kPa (a); drying the impregnated carrier at elevated temperature and under a sub-atmospheric pressure environment, which may be as hereinbefore described. Still more specifically, the impregnation may be effected by subjecting the slurry, in an initial treatment stage, to treatment at elevated temperature and under a sub-atmospheric pressure environment as hereinbefore described to impregnate the support with the cobalt salt and to dry the impregnated support partially, and thereafter, in a subsequent treatment stage, subjecting the partially dried impregnated support to treatment of elevated temperature and under a sub-atmospheric pressure environment as hereinbefore described, such that the temperature in the subsequent treatment stage exceeds that in the initial treatment stage and/or the sub-atmospheric pressure in the subsequent treatment stage is lower than that in the initial treatment stage, thereby to obtain more vigorous drying of the impregnated support in the subsequent treatment stage than in the initial treatment stage, to obtain a dried impregnated support.

The impregnation may include subjecting the support to two or more impregnation steps, to obtain a desired cobalt loading. Each impregnation step may then include an initial and a subsequent treatment stage as hereinbefore described.

The process may then include, in each of the impregnation steps, controlling the drying rate of the slurry to a specified drying profile.

The support impregnation may thus involve a 2-step slurry phase impregnation process, which is dependent on a desired cobalt loading requirement and the pore volume of the catalyst support.

The support impregnation and drying may typically be effected in a conical vacuum drier with a rotating screw or in a tumbling vacuum drier.

During the cobalt impregnation steps, a water soluble precursor salt of platinum (Pt), palladium (Pd), ruthenium (Ru), rhenium (Re) or mixtures thereof, may be added, as a dopant capable of enhancing the reducibility of the active component.

Calcination of the impregnated and dried material may be done using any method, known to those skilled in the art, for example in a fluidized bed, or a rotary kiln, calciner at 200-400° C. It may, in particular, be effected as described in PCT Patent Application WO 01/39882, which is thus also incorporated herein by reference.

The invention extends also to an activated Fischer-Tropsch catalyst, when obtained by the process of the first aspect of the invention.

The activated Fischer-Tropsch catalyst can be used in a process for producing hydrocarbons, which includes contacting a synthesis gas comprising hydrogen ($H_2$) and carbon monoxide (CO) at an elevated temperature between 180° C. and 250° C. and an elevated pressure between 10 and 40 bar with an activated Fischer-Tropsch catalyst as hereinbefore described, using a Fischer-Tropsch reaction of the hydrogen with the carbon monoxide.

The invention will now be described in more detail with reference to the following non-limiting examples:

EXAMPLE 1

A particulate supported cobalt-based Fischer-Tropsch synthesis catalyst precursor, which, on activation, produces a 30 g Co/0.075Pt/1.5Si/100 g $Al_2O_3$ proprietary slurry phase Fischer-Tropsch synthesis catalyst of the Applicant, and which is fully described in WO 01/39882, was investigated.

A representative batch of this pre-reduced catalyst precursor was specifically prepared as follows: Puralox SCCa 2/150, pore volume of 0.48 ml/g, from SASOL Germany GmbH of Uberseering 40, 22297 Hamburg, Germany was modified with silicon such that the final silicon level was 2.5 Si atoms/$nm^2$ of support. TEOS (tetra ethoxy silane) was added to ethanol, alumina (1 l ethanol/kg alumina) was added to this solution, and the resultant mixture stirred at 60° C. for 30 minutes. Subsequently the solvent was removed under vacuum with a jacket temperature of the drier equipment of 95° C. The dried modified support was then calcined at 500° C. for 2 hours. A solution of 17.4 kg of $Co(NO_3)_2.6H_2O$, 9.6 g of $(NH_3)_4Pt(NO_3)_2$, and 11 kg of distilled water was mixed with 20.0 kg of the above mentioned silica modified gamma alumina support by adding the support to the solution. The slurry was added to a conical vacuum drier and continuously mixed. The temperature of this slurry was increased to 60° C. after which a pressure of 20 kPa(a) was applied. During the first 3 hours of the drying step, the temperature was increased slowly and reached 95° C. after 3 hours. After 3 hours the pressure was decreased to 3-15 kPa(a), and a drying rate of 2.5 ml/h at the point of incipient wetness was used. The complete impregnation and drying step took 9 hours, after which the impregnated and dried catalyst support was immediately and directly loaded into a fluidised bed calciner. The temperature of the dried impregnated catalyst support was about 75° C. at the time of loading into the calciner. The loading took about 1 to 2 minutes, and the temperature inside the calciner remained at its set point of about 75° C. The dried impregnated catalyst support was heated from 75° C. to 250° C., using a heating rate of 0.5° C./min and an air space velocity of 1.0 $m^3_n$/kg $Co(NO_3)_2.6H_2O$/h, and kept at 250° C. for 6 hours. To obtain a catalyst with a cobalt loading of 30 gCo/100 g$Al_2O_3$, a second impregnation/drying/calcination step was performed. A solution of 9.4 kg of $Co(NO_3)_2.6H_2O$, 15.7 g of $(NH_3)_4Pt(NO_3)_2$, and 15.1 kg of distilled water was mixed with 20.0 kg of the catalyst precursor from the first impregnation and calcination, by adding the catalyst precursor to the solution. The slurry was added to a conical vacuum drier and continuously mixed. The temperature of this slurry was increased to 60° C. after which a pressure of 20 kPa(a) was applied. During the first 3 hours of the drying step, the temperature was increased slowly and reached 95° C. after 3 hours. After 3 hours the pressure was decreased to 3-15 kPa (a), and a drying rate of 2.5 ml/h at the point of incipient wetness was used. The complete impregnation and drying step took 9 hours, after which the treated catalyst support was immediately and directly loaded into the fluidised bed calciner. The temperature of the dried impregnated catalyst support was about 75° C. at the time of loading into the calciner. The loading took about 1 to 2 minutes, and the temperature inside the calciner remained at its set point of about 75° C. The dried impregnated catalyst was heated from 75° C. to 250° C., using a heating rate of 0.5° C./min and an air space velocity of 1.0 $m^3_n$/kg $Co(NO_3)_2.6H_2O$/h, and kept at 250° C. for 6 hours. A supported cobalt catalyst precursor on an alumina support was thus obtained.

One sample of this precursor, identified as Precursor A1, was subjected to a standard one-step reduction or activation procedure as follows:

In a fluidized bed (20 mm internal diameter) reduction unit, the catalyst precursor A1 was reduced at atmospheric pressure, utilizing an undiluted $H_2$ reducing gas (ie 100 vol % $H_2$) as total feed gas at a space velocity of 13.7 $M^3_n$ per kilogram reducible cobalt per hour, whilst applying the following temperature program: heat from 25° C. to 425° C. at 1° C./min, and hold isothermally at 425° C. for 16 hours.

Precursor A1 was thus thereby transformed into comparative Catalyst A1.

Another sample of the precursor, identified as Catalyst precursor A2, was reduced in the same manner as catalyst precursor A1, with the only difference being the isothermal hold at 425° C. which was 4 hours for precursor A2.

One further sample of this precursor, identified as Precursor B1, was subjected to the following 3-stage reduction procedure (i) in a first activation stage, the sample was heated from 25° C. to 140° C. at a first heating rate of 1° C./min;

(ii) in a second activation stage, the sample was held at the same space velocity as was used in the first activation stage, and at the temperature of 140° C., for 3 hours;

(iii) in a third activation stage, the sample was heated from 140° C. to 425° C. at a heating rate of 1° C./min and using the same space velocity as in the first and second activation stages; the temperature was held at 425° C. for 16 hours.

This reduction procedure was also carried out in the fluidized bed reduction unit hereinbefore described, and the same undiluted $H_2$ reducing gas (ie 100 vol % $H_2$) was used in all three activation stages. During all three stages a space velocity of 13.7 $m_n^3$/kg reducible cobalt/hour was used.

Thus, Precursor B1 was subjected to a 3-stage reduction/activation procedure in accordance with the invention, to obtain Catalyst B1 which is thus in accordance with the invention.

During reduction, precursors A1, A2 and B1 were thus transformed into Fischer-Tropsch synthesis ('FTS') Catalysts A1, A2 and B1 respectively. These catalysts were evaluated in a laboratory scale reactor under realistic FTS conditions (230° C., between 16.2-16.4 bar of $H_2$ and CO pressure in inlet gas mixture, $H_2$:CO inlet ratio of 1.9:1 achieving synthesis gas conversions of 60±5%).

TABLE 1

Summary of the FTS runs of Example 1

| Run | Catalyst | $CH_4$ sel. (%)* | RIAF (relative to catalyst A1) | Time (hours) |
|---|---|---|---|---|
| 198£ | A1 (comparative) | 6.4 | 1.00 | 15 |
| CB036 | A2 (comparative) | — | 1.04 | 15 |
| 406$ | B1 | 6.8 | 1.25 | 21 |

RIAF = Relative Intrinsic Fischer-Tropsch synthesis Activity Factor

From Table 1, it is evident that the 3-stage reduction in accordance with the invention did not influence the selectivity of the catalyst towards methane formation.

From Table 1 (RIAF data) it is clear that the activity of the 3-stage reduced catalyst B (run 406$) is significantly higher than that of the standard reduced catalyst A1 or A2 (run 198£ and CB036 respectively) after 1 day online.

The Relative Intrinsic Fischer-Tropsch synthesis Activity Factor ('$RIAF_x$') of a supported cobalt slurry phase catalyst, of which the pre-reduction catalyst precursor has been prepared in strict accordance with a prescribed catalyst preparation procedure X, ie catalyst precursor X, is defined as:

$$RIAF_x = [A_{xi}/A_x] \quad (1)$$

where:
a) $A_{xi}$ is the Arrhenius pre-exponential factor of catalyst precursor X, activated according to an arbitrary reduction procedure
b) $A_x$ is the Arrhenius pre-exponential factor of catalyst precursor X, estimated from the 15 hours on stream slurry-phase Continuous Stirred Tank Reactor (CSTR) Fischer-Tropsch synthesis performance under realistic conditions, and having utilized the standard one step reduction procedure:
  Fluidized bed (20 mm internal diameter) reduction of 15±5 g catalyst precursor A (ie pre-reduction catalyst mass), at atmospheric pressure utilizing an undiluted $H_2$ reducing gas (purity of 5.0) as total feed at a space velocity of 13700 $ml_n$ per gram reducible cobalt per hour, whilst applying the following temperature program: heat from 25° C. to 425° C. at 1° C./min, and hold isothermally at 425° C. for 16 hours.

c) The pre-exponential factor A, ie applicable to both $A_{xi}$ and $A_x$, is defined from the generally accepted cobalt-based Fischer-Tropsch empirical kinetic expression:

$$r_{FT} = [Ae^{(-Ea/RT)}P_{H2}P_{CO}]/[1+KP_{CO}]^2 \quad (2)$$

Thus:

$$A = [r_{FT}(1+KP_{CO})^2]/[e^{(-Ea/RT)}P_{H2}P_{CO}] \quad (3)$$

where:
  $r_{FT}$ is expressed in terms of the number of moles of CO converted into Fischer-Tropsch synthesis products per unit time per unit mass of the catalyst precursor in its pre-reduction state.
d) x is any catalyst precursor.

EXAMPLE 2

Catalyst precursors $B_i$ (i=3 to 9) are also particulate supported cobalt-based Fischer-Tropsch synthesis catalyst precursors, which, on activation, produce 30 g Co/0.075Pt/1.5Si/100 g $Al_2O_3$ proprietary slurry phase Fischer-Tropsch synthesis catalysts of the Applicant, and which are fully described in WO 01/39882. They were produced in similar fashion to catalyst precursors A1, A2 and B1 described in Example 1.

Samples of this precursor, identified as Precursor $B_i$, were subjected to the following 3-stage reduction procedure (Table 2):
(i) in a first activation stage, the sample was heated from 25° C. to X° C. at a first heating rate of 1° C./min and using gas mixture Y;
(ii) in a second activation stage, the sample was held at the same space velocity as was used in the first activation stage, and at the temperature of X° C., for 3 hours using gas mixture V;
(iii) in a third activation stage, the sample was heated from X° C. to 425° C. at a heating rate of 1° C./min and using the same space velocity as in the first and second activation stages; the temperature was held at 425° C. for 4 hours.

This reduction procedure was also carried out in the fluidized bed reduction unit hereinbefore described. During all three stages, a total space velocity of 13.7 $m_n^3$/kg reducible cobalt/hour was used.

Thus, precursors $B_i$ were subjected to a 3-stage reduction/activation procedure in accordance with the invention, to obtain Catalysts $B_i$. Precursors $B_3$-$B_9$ were subjected to the 3-stage reduction/activation procedure in accordance with the invention, and hence corresponding Catalysts $B_3$-$B_9$ are also in accordance with the invention During reduction, precursors $B_i$ (i=3 to 9) were thus transformed into Fischer-Tropsch synthesis ('FTS') Catalysts $B_i$ (i=3 to 9) respectively. These catalysts were evaluated in a laboratory scale reactor under realistic FTS conditions (230° C., 17.5 $bar_g$ pressure, $H_2$:CO inlet ratio of 1.9:1, inlet gas contains 15% inerts (hence 85% of inlet is $H_2$ and CO), and at synthesis gas conversions of between 50 and 65%).

TABLE 2

Summary of the FTS runs of Catalysts $B_i$

| Catalysts | Temperature X° C. | Gas mixture Y | Gas mixture V | Run | RIAF after 15 hours on line relative to sample A |
|---|---|---|---|---|---|
| A1 (comp) | — | — | — | 198£ | 1.00 |
| $A_{2(comparative)}$ | — | — | — | CB036 | 1.04 |

TABLE 2-continued

Summary of the FTS runs of Catalysts $B_i$

| Catalysts | Temperature X° C. | Gas mixture Y | Gas mixture V | Run | RIAF after 15 hours on line relative to sample A |
|---|---|---|---|---|---|
| $B_3$ | 125 | 100% $H_2$ | 100% $H_2$ | CC037 | 1.12 |
| $B_4$ | 130 | 100% $H_2$ | 100% $H_2$ | CC032 | 1.21 |
| $B_5$ | 135 | 100% $H_2$ | 100% $H_2$ | CC033 | 1.27 |
| $B_6$ | 140 | 100% $H_2$ | 100% $H_2$ | CC035 | 1.22 |
| $B_7$ | 145 | 100% $H_2$ | 100% $H_2$ | CC041 | 1.21 |
| $B_8$ | 150 | 100% $H_2$ | 100% $H_2$ | CC030 | 1.09 |
| $B_9$ | 140 | $N_2$ | 100% $H_2$ | CC036 | 1.22 |

It can be concluded from Table 2 that catalysts prepared according to the 3-stage reduction process of the invention, using the correct gas mixtures and temperatures, have increased catalyst activities.

EXAMPLE 3

A 30 g Co/0.075 g Pt/100 g (1.5 g Si/100 g Puralox SCCa 2/150) slurry phase Fischer-Tropsch synthesis ("FTS") catalyst was prepared on a particulate modified 1.5 g Si/100 g Puralox SCCa 2/150 (trademark) pre-shaped support using aqueous slurry phase impregnation and drying, followed by direct fluidised bed calcination as disclosed generally in U.S. Pat. No. 5,733,839, WO 99/42214 and WO 00/20116, which are hence incorporated herein by reference. Puralox SCCa 2/150 is a pure pre-shaped gamma-alumina particulate catalyst support, and is prepared by calcination of boehmite. However, in this case the support has been modified, during manufacture thereof, so that it contains 1.5 g Si/100 g support. For this manufacture, the procedure used was as is described in WO 99/42214.

In particular, the catalyst was prepared as follows:

43.70 g $Co(NO_3)_2.6H_2O$ was dissolved in 40 ml distilled water, and 0.024 g of $Pt(NH_3)_4.(NO_3)_2$ (dissolved in 10 ml distilled water) and 3.75 grams of maleic anhydride were added to this solution in a 500 ml round ball flask in a rotorvapor at 60° C. and atmospheric pressure, whereafter 50.0 g of the 1.5 g Si/100 g Puralox SCCa 2/150 modified pre-shaped support was added to the solution. Aqueous slurry phase impregnation and vacuum drying was effected using the following procedure:

| Temperature of oil bath (° C.) | Rotorvapor pressure (mbar)(a) | Time (minutes) |
|---|---|---|
| 60 | Atmospheric | 10 |
| 60 | 260 | 30 |
| 70 | 260 | 90 |
| 85 | 260 | 60 |
| 85 | 50 | 240 |

This vacuum dried intermediate was directly subjected to a fluidized bed calcination step, according to the following procedure:

Continuous air flow of 1.7 $dm^3_n$/min

Temperature Program:

From 25° C. to 250° C. at 1 and keeping it at 250° C. for 6 hours 50.0 g of this intermediate calcined material was subjected to the following $2^{nd}$ cobalt/platinum impregnation and calcination step:

23.51 g $Co(NO_3)_2.6H_2O$ was dissolved in 40 ml distilled water and 0.039 g of $Pt(NH_3)_4.(NO_3)_2$ (dissolved in 10 ml distilled water) was added to this solution in a 500 ml round ball flask in a rotorvapor at 60° C. and atmospheric pressure, and 50.0 g of the ex $1^{st}$ cobalt/platinum impregnated and calcined intermediate was added. Aqueous slurry phase impregnation and vacuum drying was effected via the following procedure:

| Temperature of oil bath (° C.) | Rotorvapor pressure (mbar)(a) | Time (minutes) |
|---|---|---|
| 60 | Atmospheric | 10 |
| 60 | 260 | 30 |
| 70 | 260 | 90 |
| 85 | 260 | 60 |
| 85 | 50 | 240 |

This vacuum dried intermediate was directly subjected to a fluidized bed calcination step, according to the following procedure:

Continuous air flow of 1.7 $dm^3_n$/min

Temperature Program:

From 25° C. to 250° C. at 1° C./min and keeping it at 250° C. for 6 hours

In preparation for laboratory scale slurry phase continuous stirred tank reactor ('CSTR') Fischer-Tropsch synthesis (FTS) runs, this calcined material was reduced in accordance with the following procedure, and wax coated:

Samples of this precursor, identified as Precursor $C_i$, were subjected to the following 3-stage reduction procedure (Table 3)

(i) in a first activation stage, the sample was heated from 25° C. to X° C. at a first heating rate of 1° C./min and using pure 100% hydrogen;

(ii) in a second activation stage, the sample was held at the same space velocity as was used in the first activation stage, and at the temperature of X° C., for 3 hours using pure 100% hydrogen;

(iii) in a third activation stage, the sample was heated from X° C. to 425° C. at a heating rate of 1° C./min and using the same space velocity as in the first and second activation stages; the temperature was held at 425° C. for 10 hours.

This reduction procedure was also carried out in the fluidized bed reduction unit hereinbefore described. During all three stages a total space velocity of 13.7 $m_n^3$/kg reducible cobalt per hour was used.

Thus, precursors $C_i$ (i=2-5) were subjected to a 3-stage reduction/activation procedure in accordance with the invention, to obtain Catalysts $C_i$ (i=2-5) which were thus in accordance with the invention.

During reduction, precursors $C_i$ (i=1 to 5) were thus transformed into Fischer-Tropsch synthesis ('FTS') Catalysts $C_i$ (i=1 to 5) respectively. These catalysts were evaluated in a laboratory scale reactor under realistic FTS conditions (230° C., 17.0 bar$_g$ pressure, $H_2$:CO inlet ratio of 1.6:1, inlet contains 15% inerts (hence 85% of inlet is $H_2$ and CO), and at synthesis gas conversions of between 50 and 65%).

TABLE 3

Summary of the FTS runs of Catalysts $C_i$

| Catalysts | Temperature X° C. | Run | RIAF$_{1.6}$ after 15 hours on line relative to that of $C_1$ |
|---|---|---|---|
| $C_{1(comparitive)}$ | 70 | BG009 | 1.00 |
| $C_2$ | 80 | BG010 | 1.09 |
| $C_3$ | 90 | BH008 | 1.14 |
| $C_4$ | 100 | BG007 | 1.10 |
| $C_5$ | 110 | BH007 | 1.17 |

It can be concluded from Table 3 that catalysts containing 30 gCo/100 gAl2O3 and prepared by using organic modifiers (ie maleic anhydride) and reduced according to the 3-stage process of the invention, using the correct temperature during the first activation stage, have increased catalyst activities.

EXAMPLE 4

A particulate supported cobalt-based Fischer-Tropsch synthesis catalyst precursor, which, on activation, produces an 18 g Co/0.15 g Pd/1.5 g Si/100 g Al$_2$O$_3$ proprietary slurry phase Fischer-Tropsch synthesis catalyst of the Applicant, and which is fully described in WO 01/39882, was investigated.

A representative batch of this pre-reduced catalyst precursor was specifically prepared as follows: Puralox SCCa 2/150, pore volume of 0.48 ml/g, from SASOL Germany GmbH of Uberseering 40, 22297 Hamburg, Germany was modified with silicon such that the final silicon level was 2.5 Si atoms/nm$^2$ of support. TEOS (tetra ethoxy silane) was added to ethanol, alumina (1l ethanol/kg alumina) was added to this solution, and the resultant mixture stirred at 60° C. for 30 minutes. Subsequently the solvent was removed under vacuum with a jacket temperature of the drier equipment of 95° C. The dried modified support was then calcined at 500° C. for 2 hours. A solution of 88.89 g of Co(NO$_3$)$_2$.6H$_2$O, 2.297 g of a 6.53% (NH$_3$)$_4$Pd(NO$_3$)$_2$ aqueous solution, and 100 ml of distilled water was placed in a 1000 ml Büchi round bottom flask, connected in a Büchi evaporator and heated in an oil bath to 60° C. 100.0 g of the above mentioned silica modified gamma alumina support was added to the solution. The slurry was continuously mixed. After 10 minutes 200 mbar vacuum was drawn on the flask. The mixing was continued at the mentioned conditions. After 30 minutes the temperature was increased to 70° C. After 90 minutes the temperature was increased to 85° C. After 60 minutes the vacuum was increased to 50 mbar. Mixing was continued at these conditions for 240 minutes. The complete impregnation and drying step took 7 hours and 10 minutes, after which the impregnated and dried catalyst support was immediately and directly loaded into a fluidised bed calciner. The dried impregnated catalyst was heated from the catalyst temperature ±50° C. to 290° C., using a heating rate of 1.0° C./min and an air space velocity of 1.0 m$^3_n$/kg Co(NO$_3$)$_2$.6H$_2$O/h, and kept at 290° C. for 6 hours. A supported cobalt catalyst precursor on an alumina support was thus obtained.

One sample of this precursor, identified as Precursor $D_1$, was subjected to a standard reduction or activation procedure as follows:

In a fluidized bed (20 mm internal diameter) reduction unit, the catalyst precursor $D_1$ was reduced, at atmospheric pressure, utilizing an undiluted $H_2$ reducing gas as total feed gas at a space velocity of 22.8 m$^3_n$ per kilogram reducible cobalt per hour, whilst applying the following temperature program: heat from 25° C. to 425° C. at 1° C./min, and hold isothermally at 425° C. for 4 hours. Precursor $D_1$, was thus thereby transformed into comparative Catalyst $D_1$.

Samples of this precursor, identified as Precursor $D_i$ (i=2-4) were subjected to the following sequential reduction procedure (Table 4)

(i) in a first activation stage, the sample was heated from 25° C. to X° C. at a first heating rate of 1° C./min and using pure 100% hydrogen;

(ii) in a second activation stage, the sample was held at the same space velocity as was used in the first activation stage, and at the temperature of X° C., for 3 hours using pure 100% hydrogen;

(iii) in a third activation stage, the sample was heated from X° C. to 425° C. at a heating rate of 1° C./min and using the same space velocity as in the first and second activation stages; the temperature was held at 425° C. for 4 hours.

This reduction procedure was also carried out in the fluidized bed reduction unit hereinbefore described. During all three stages a total space velocity of 22.8 m$_n^3$/kg reducible cobalt per hour was used.

Thus, Precursors $D_i$ (i=2 to 4) was subjected to a 3-stage reduction/activation procedure in accordance with the invention, to obtain Catalysts $D_i$ which are thus in accordance with the invention.

During reduction, precursors $D_i$ (i=1 to 4) were thus transformed into Fischer-Tropsch synthesis ('FTS') Catalysts $D_i$ (i=1 to 4) respectively. These catalysts were evaluated in a laboratory scale reactor under realistic FTS conditions (230° C., 17.0 bar$_g$ pressure, $H_2$:CO inlet ratio of 1.6:1, inlet contains 15% inerts (hence 85% of inlet is $H_2$ and CO), and at synthesis gas conversions of between 50 and 65%).

TABLE 4

Summary of the FTS runs of Catalysts $D_i$

| Catalysts | Temperature X° C. | Run | RIAF$_{1.6}$ after 15 hours on line relative to that of $D_1$ |
|---|---|---|---|
| $D_{1(comparative)}$ |  | BI015 | 1.00 |
| $D_2$ | 110 | BL017 | 1.08 |
| $D_3$ | 120 | BK019 | 1.12 |
| $D_4$ | 130 | BI014 | 1.15 |

It can be concluded from table 4 that the catalysts precursors containing 18 g Co/100 gAl2O3 and using Pd as a promoter that were reduced according to the 3-stage process, using the correct temperature during the 2-stage, results in catalysts with increased catalyst activities.

EXAMPLE 5

Catalyst precursor E is also particulate supported cobalt-based Fischer-Tropsch synthesis catalyst precursor, which, on activation, produces a 30 g Co/0.075Pt/1.5Si/100 g Al$_2$O$_3$ proprietary slurry phase Fischer-Tropsch synthesis catalyst of the Applicant, and which is fully described in WO 01/39882. It was produced in similar fashion to catalyst precursors A and B.

A sample of this precursor, identified as Precursor E, was subjected to the following 3 stage reduction procedure (Table 5):

(i) in a first activation stage, the sample was heated from 25° C. to 120° C. at a first heating rate of 1° C./min using undiluted hydrogen;
(ii) in a second activation stage, sample B was heated from 120° C. to 140° C. at a second heating rate of 0.11° C./minute at the same space velocity as was used in the first activation stage,
(iii) in a third activation stage, the sample was heated from 140° C. to 425° C. at a heating rate of 1° C./min and using the same space velocity as in the first and second activation stages; the temperature was held at 425° C. for 4 hours.

This reduction procedure was also carried out in the fluidized bed reduction unit hereinbefore described. During all three stages a total space velocity of 13.7 $m_n^3$/kg reducible cobalt per hour was used.

Thus, Precursor E was subjected to a 3-stage reduction/activation procedure in accordance with the invention, to obtain Catalyst E which is thus in accordance with the invention.

During reduction, precursor E was thus transformed into Fischer-Tropsch synthesis ('FTS') Catalyst E. This catalyst was evaluated in a laboratory scale reactor under realistic FTS conditions (230° C., 17.5 $bar_g$ pressure, $H_2$:CO inlet ratio of 1.9:1, inlet contains 15% inerts (hence 85% of inlet is $H_2$ and CO), and at synthesis gas conversions of between 50 and 65%).

TABLE 5

| Catalysts | Stage 2 conditions | Gas mixture | Run | RIAF after 15 hours on line relative to sample A |
|---|---|---|---|---|
| A |  | 100% $H_2$ | 198£ | 1.00 |
| E | Ramping from 120 to 140° C. with a ramp rate of 0,11 | 100% $H_2$ | CC042 | 1.20 |

It can be concluded from Table 5 that the catalyst precursor that was reduced according to the 3-stage reduction process of the invention, using the correct slow heating rate during activation stage 2, results in a catalyst with increased catalyst activity.

EXAMPLE 6

A spent cobalt FTS catalyst sample containing 30 gCo/100 g support that was used during Fischer-Tropsch synthesis for a period of time was regenerated by means of the following procedure:

The wax coated spent catalyst was hydrogenated in hydrogen at 350° C. and after cooling down passivated with dry ice (ie $CO_2$). The passivated catalyst sample was subsequently subjected to oxidation in a laboratory fluidized bed calcination unit using air. This regenerated catalyst precursor is catalyst precursor F.

Catalyst precursor F1 was reduced using the following standard one-step comparative procedure:

The oxidized catalyst precursor was subjected to the following reduction procedure in a fluidized bed laboratory reduction unit: hydrogen space velocity of 1500 $ml_n$/(g catalyst)/hr; heating rate of 1° C./min up to a temperature of 425° C.; held at 425° C. for 16 hours. After cooling down to room temperature under hydrogen, the reduced (activated) catalyst was unloaded into wax, prior to re-use.

Catalyst precursor F2 was reduced using the 3-stage reduction procedure of the invention:

The oxidized catalyst precursor was subsequently subjected to the following reduction procedure in a fluidized bed laboratory reduction unit, with hydrogen space velocity of 1500 $ml_n$/(g catalyst)/hr:
(i) heating rate of 1° C./min up to a temperature of 90° C.;
(ii) heating rate of 0.07° C./min from 90° C. to 160° C. and
(iii) a heating rate of 1° C./min from 160° C. up to 425° C. and held at 425° C. for 16 hours. After cooling down to room temperature (±25° C.) under hydrogen, the reduced (activated) catalyst wax unloaded into wax, prior to re-use.

The samples regenerated using the standard reduction procedure (ie F1) and the 3-stage reduction procedure (ie F2) were tested for their Fischer-Tropsch synthesis performance in a laboratory micro slurry reactor (see Table 6).

TABLE 6

Summary of the FTS runs of Catalysts $F_i$

| Catalysts | Run | RIAF$_{1.6}$ after 15 hours on line relative to that of $F_1$ |
|---|---|---|
| F1 (comparative) | 480Yen | 1.00 |
| F2 | 490Yen | 1.13 |

It can be concluded from Table 6 that the regenerated catalyst precursor that is reduced according to the 3-stage process of the invention, result in a catalyst with increased catalyst activity.

EXAMPLE 7

Another spent cobalt FTS catalyst sample containing 30 gCo/100 g support that was used during Fischer-Tropsch synthesis for a period of time was regenerated by means of the following procedure:

The wax coated spent catalyst was hydrogenated in hydrogen at 350° C. and after cooling down passivated with dry ice (ie $CO_2$). The passivated catalyst sample was subsequently subjected to oxidation in a laboratory fluidized bed calcination unit using air. This regenerated catalyst precursor is catalyst precursor G.

Catalyst precursor G1 was reduced using the following standard one-step comparative procedure:

The oxidized catalyst precursor was subjected to the following reduction procedure in a fluidized bed laboratory reduction unit: hydrogen space velocity of 1500 $ml_n$/(g catalyst)/hr; heating rate of 1° C./min up to a temperature of 425° C.; held at 425° C. for 16 hours. After cooling down to room temperature under hydrogen, the reduced (activated) catalyst was unloaded into wax, prior to re-use.

Catalyst precursor G2 was reduced using the 3-stage procedure of the invention:

The oxidized catalyst precursor was subsequently subjected to the following reduction procedure in a fluidized bed laboratory reduction unit; with hydrogen space velocity of 1500 $ml_n$/(g catalyst)/hr;
(i) heating rate of 1° C./min up to a temperature of 130° C.;
(ii) hold time of 3 hours at 130° C.
(iii) a heating rate of 1° C./min from 130° C. up to 425° C. and held at 425° C. for 16 hours. After cooling down to room temperature (±25° C.) under hydrogen, the reduced (activated) catalyst wax unloaded into wax, prior to re-use.

The samples regenerated using the standard reduction procedure (ie G1) and the 3-stage reduction procedure (ie G2)

were tested for their Fischer-Tropsch synthesis performance in a laboratory micro slurry reactor (see Table 7).

TABLE 7

Summary of the FTS runs of Catalysts $G_i$

| Catalysts | Run | $RIAF_{1.6}$ after 15 hours on line relative to that of F1 |
|---|---|---|
| G1 (comparative) | BF039 | 1.00 |
| G2 | BC084 | 1.17 |

It can be concluded from table 7 that regenerated catalysts precursor that was reduced according to the 3-stage process, result in a catalyst with increased catalyst activities.

The invention claimed is:

1. A process for producing a supported cobalt-based Fischer-Tropsch synthesis catalyst, which process includes
    in a first activation stage, treating a particulate supported cobalt-based Fischer-Tropsch synthesis catalyst precursor comprising a catalyst support impregnated with cobalt and containing cobalt oxide, with a hydrogen-containing reducing gas or a nitrogen-containing gas, at a first heating rate, HR1, until the precursor has reached a temperature, $T_1$, where 80° C.$\leq T_1 \leq$180° C., to obtain a partially treated catalyst precursor;
    in a second activation stage, treating the partially treated catalyst precursor with a hydrogen-containing reducing gas, at a second heating rate, HR2, where 0$\leq$HR2<HR1, for a time, $t_1$, where $t_1$ is from 0.1 to 20 hours, to obtain a partially reduced catalyst precursor; and thereafter
    in a third activation stage, treating the partially reduced catalyst precursor with a hydrogen-containing reducing gas, at a third heating rate, HR3, where HR3>HR2 until the partially reduced catalyst precursor reaches a temperature, $T_2$ wherein 300° C. $\leq T_2 \leq$600° C., and maintaining the partially reduced catalyst precursor at $T_2$ for a time, $t_2$, where $t_2$ is from 0 to 20 hours, to obtain an activated supported cobalt-based Fischer-Tropsch synthesis catalyst.

2. A process according to claim 1 wherein, in the first activation stage, 0.5° C./min$\leq$HR1$\leq$10° C./min.

3. A process according to claim 1 wherein, in the first activation stage, 1° C./min$\leq$HR1$\leq$2° C./min.

4. A process according to claim 1 wherein, in the second activation stage, 1$\leq t_1 \leq$10 hours.

5. A process according to claim 4 wherein, in the second activation stage, 2$\leq t_1 \leq$6 hours.

6. A process according to claim 1 wherein, in the second activation stage, the precursor is maintained at the temperature $T_1$.

7. A process according to claim 1 wherein, in the second activation stage, 0.05° C./min$\leq$HR2$\leq$0.5° C./min.

8. A process according to claim 7 wherein, in the second activation stage 0.1° C./min$\leq$HR2$\leq$0.2° C./min.

9. A process according to claim 1 wherein, in the third activation stage, 1$\leq t_2 \leq$10 hours.

10. A process according to claim 1, wherein the space velocity of the gas is constant during the treatments in the first, second and third stages.

11. A process according to claim 1, wherein the treatments in the first, second and third activation stages are each effected at a pressure between 0.6 and 1.3 bar(a).

12. A process according to claim 1, wherein a hydrogen-containing reducing gas is used in the first activation stage, with the hydrogen-containing reducing gas in each of the activation stages comprising >90 vol % $H_2$ and less than 10 vol % inerts.

13. A process according to claim 12, wherein the hydrogen-containing reducing gas in each of the activation stages comprises >97 vol % $H_2$ and <3 vol % inerts.

* * * * *